May 17, 1932.  W. W. SLOANE  1,859,263
POWER SHOVEL
Filed Oct. 10, 1929  7 Sheets-Sheet 1
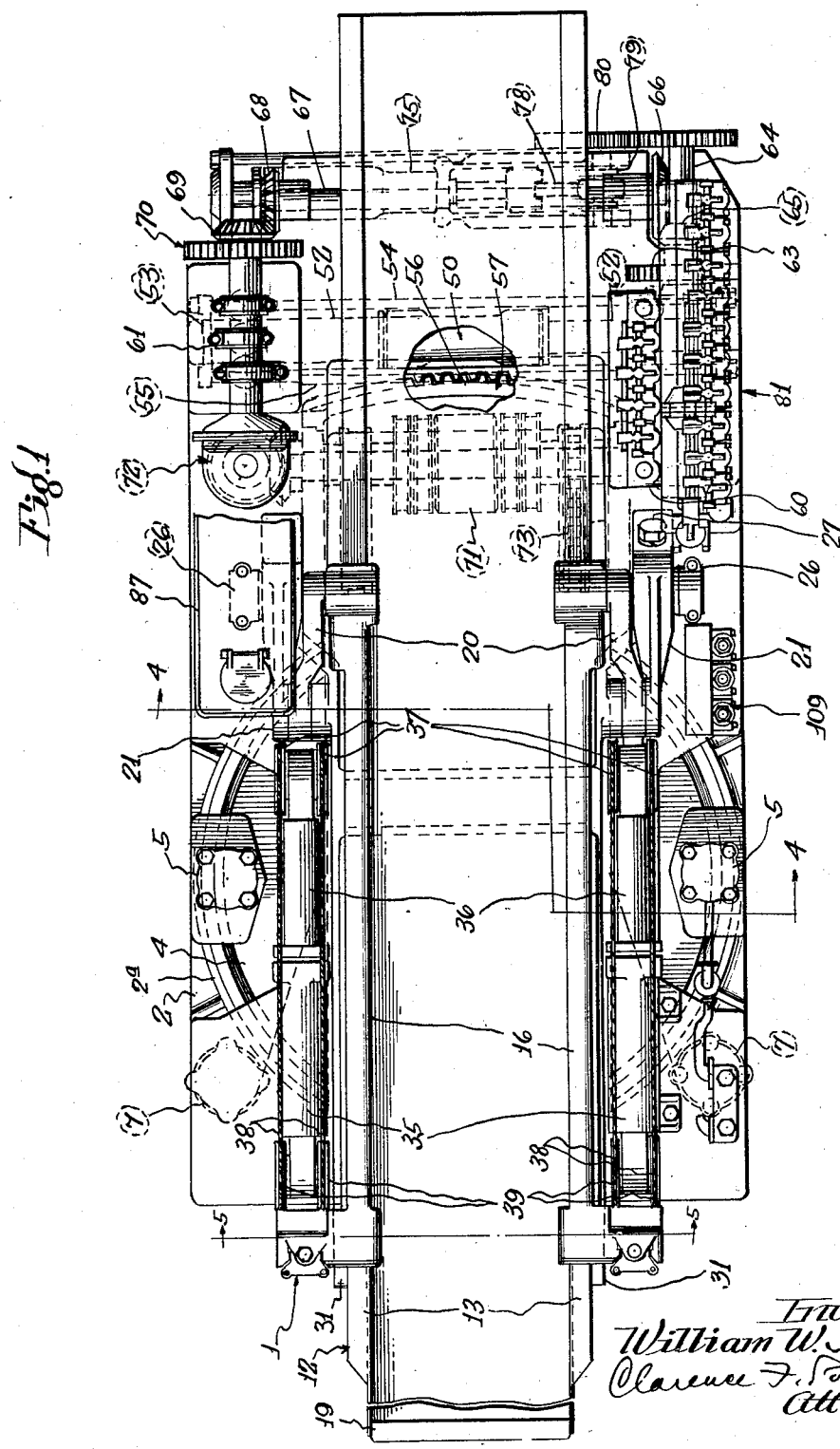

May 17, 1932.  W. W. SLOANE  1,859,263
POWER SHOVEL
Filed Oct. 10, 1929  7 Sheets-Sheet 2
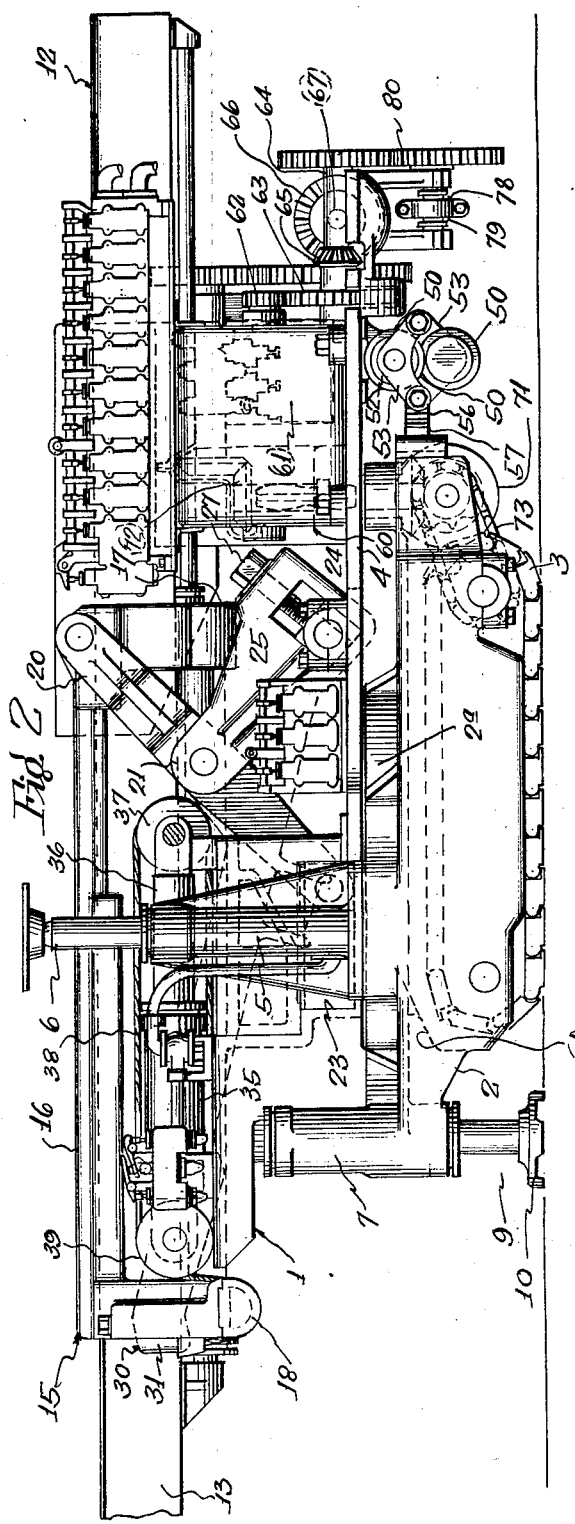
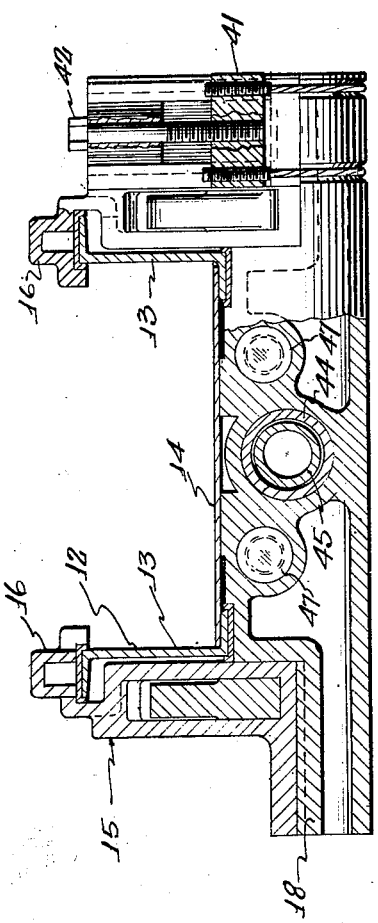
Inventor
William W. Sloane
Clarence F. Poole
Attorney

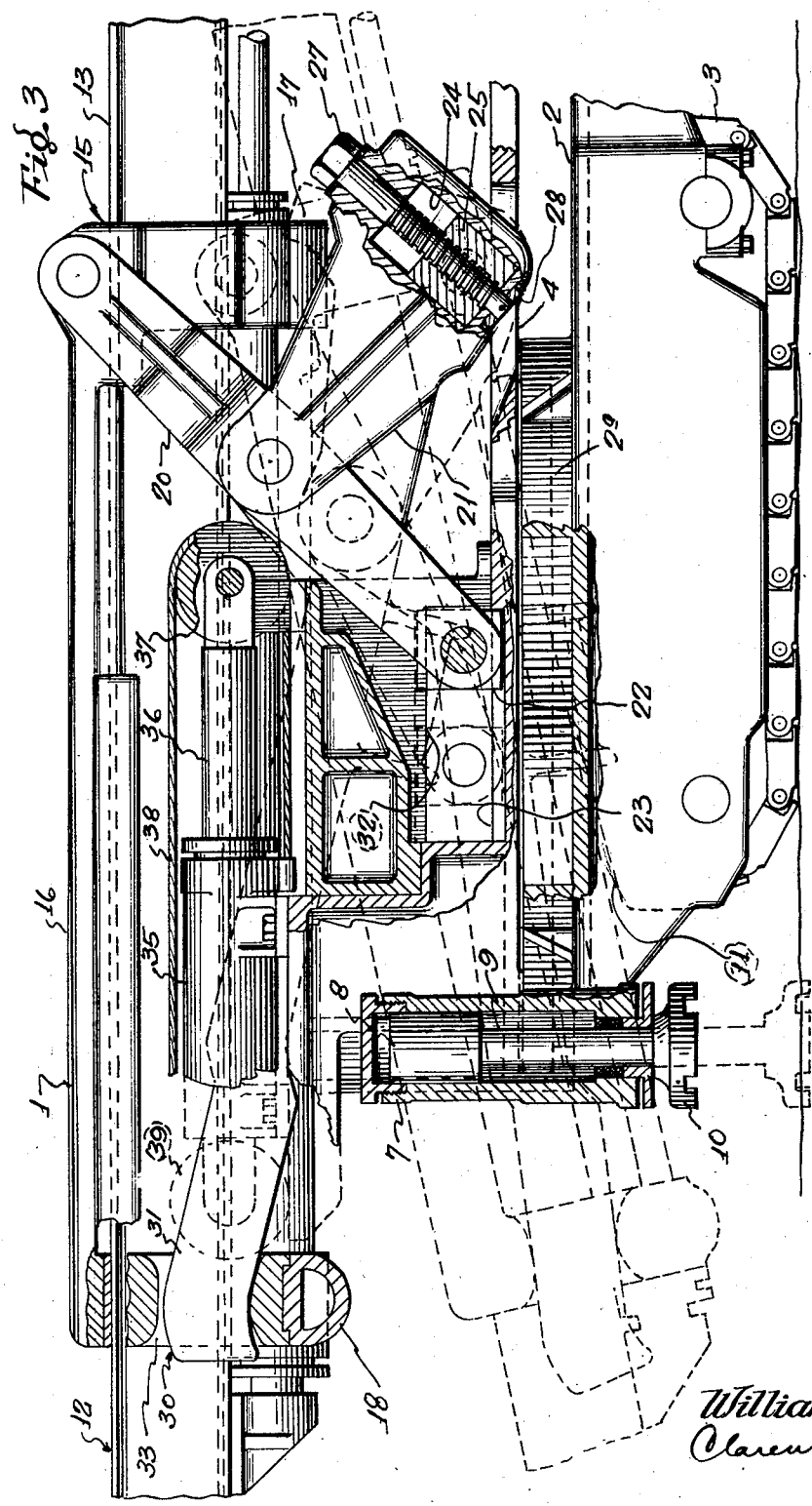

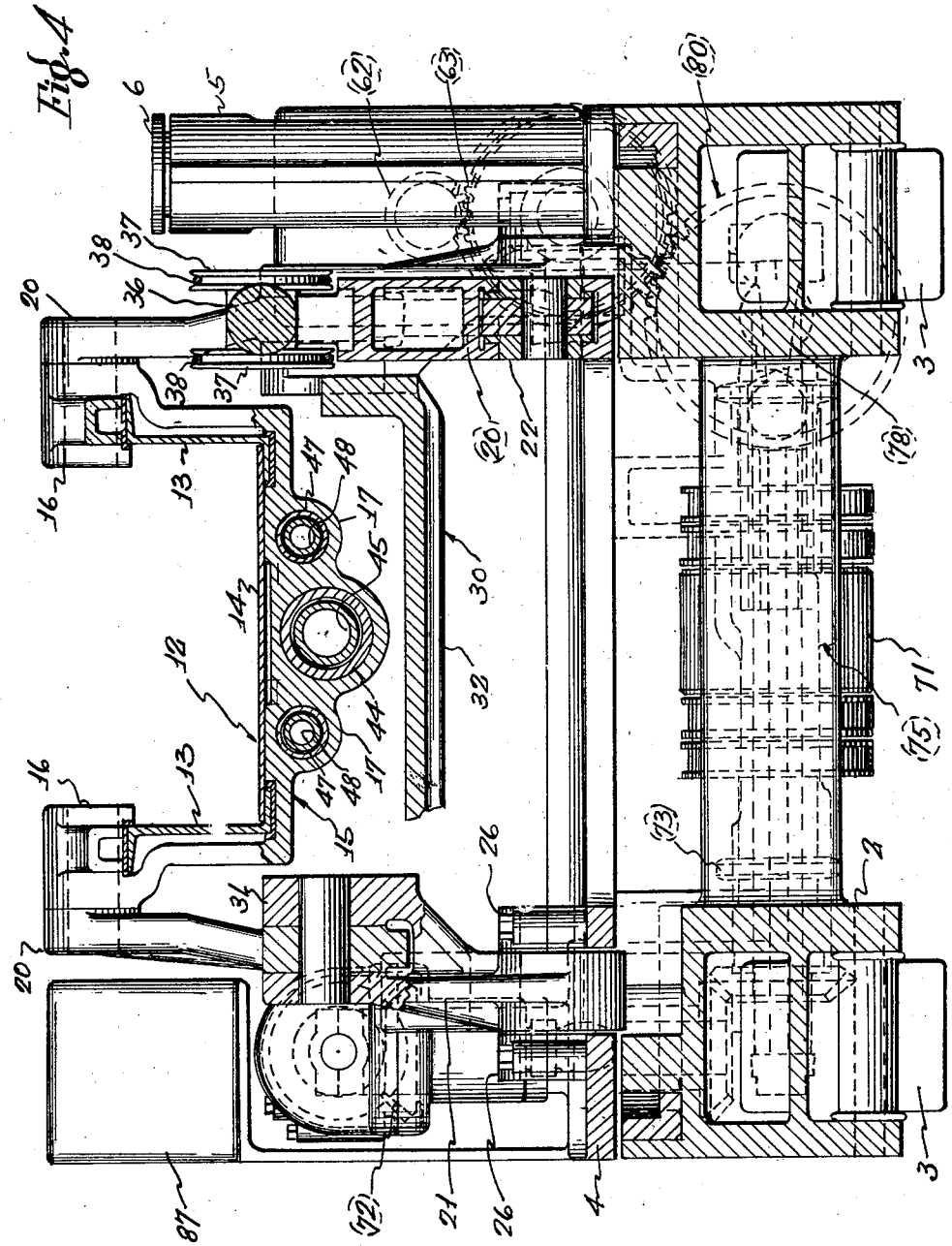

May 17, 1932. W. W. SLOANE 1,859,263
POWER SHOVEL
Filed Oct. 10, 1929 7 Sheets-Sheet 5
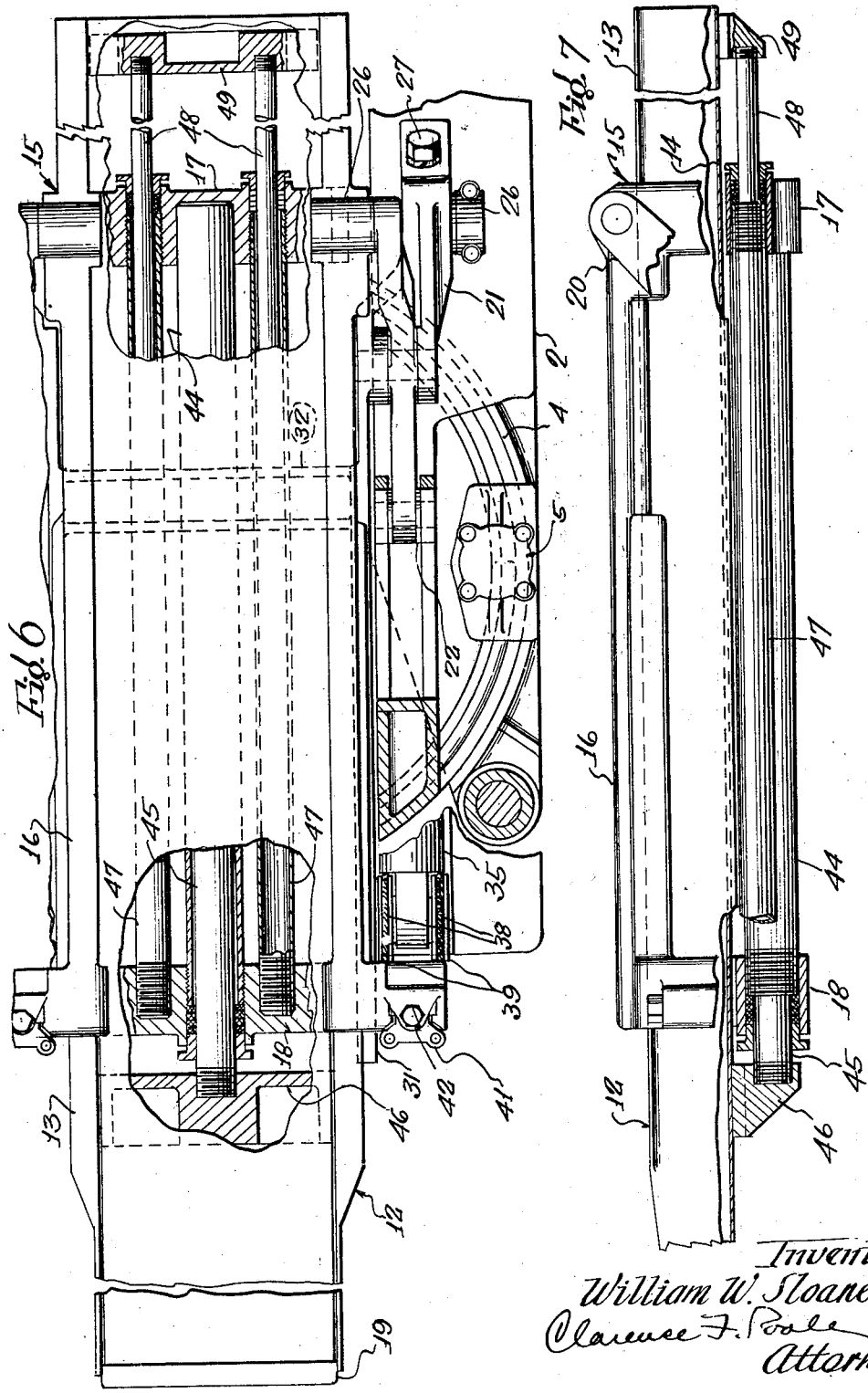
Inventor
William W. Sloane
Clarence F. Poole
Attorney

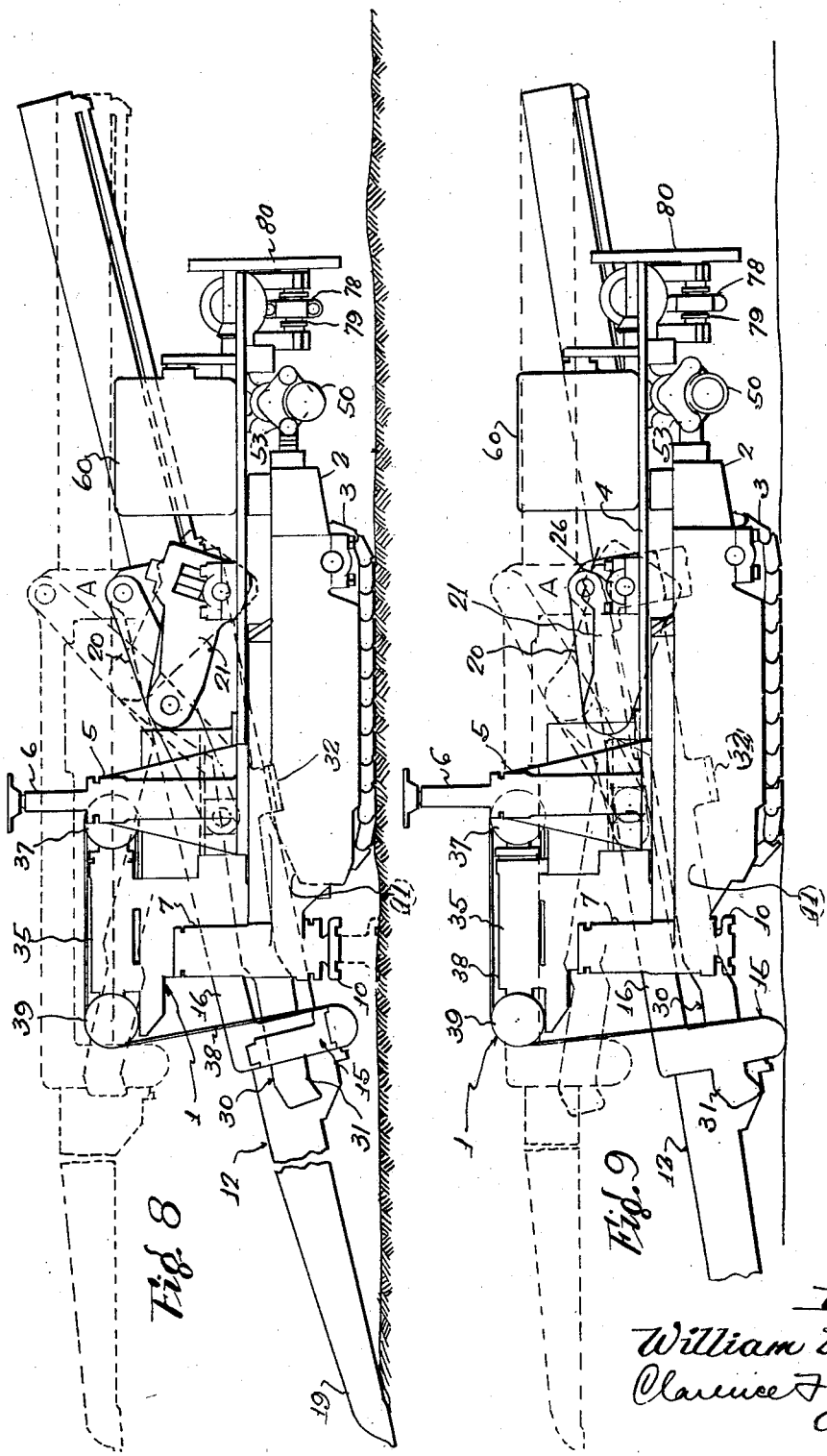

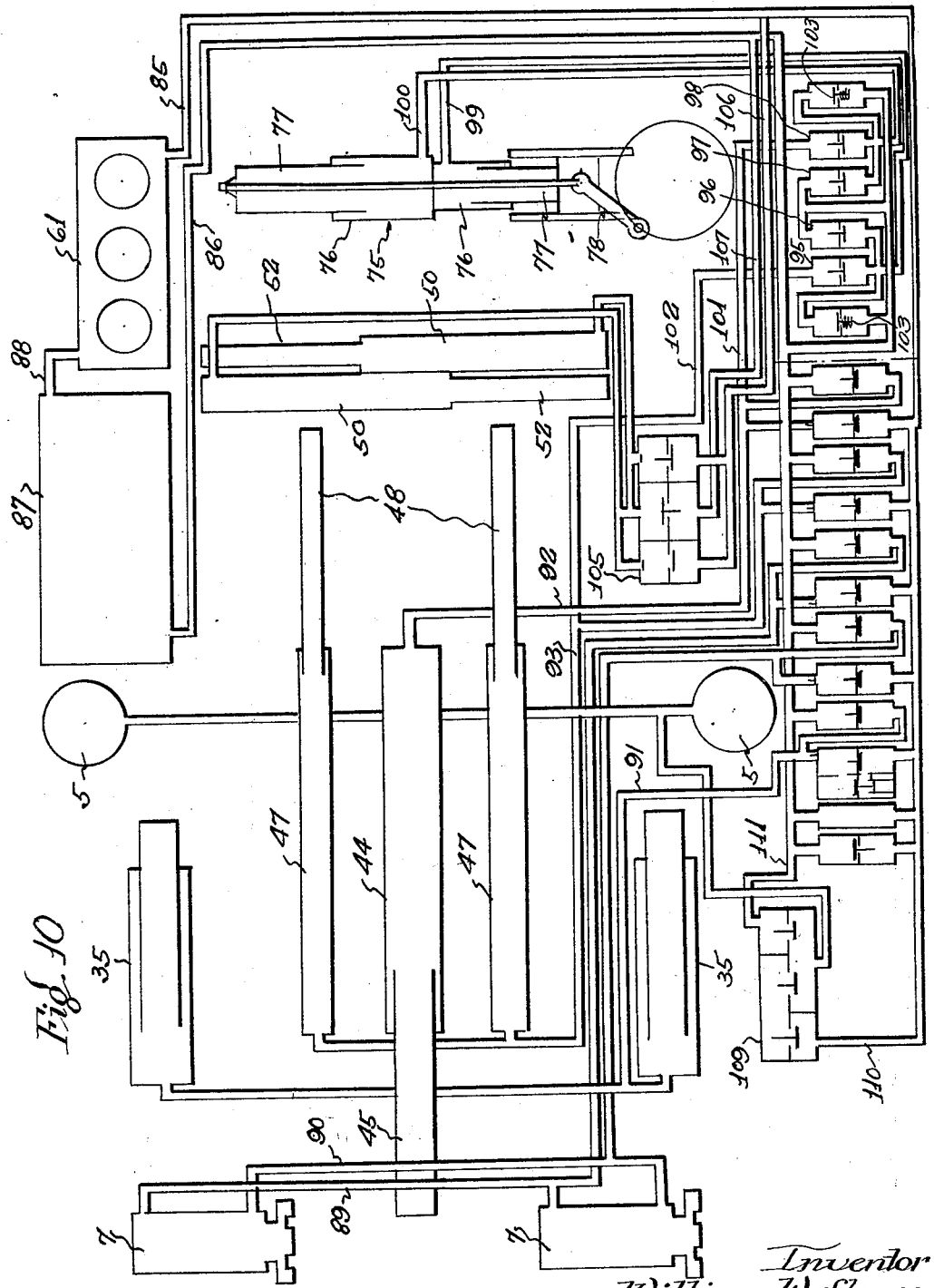

Patented May 17, 1932

1,859,263

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

POWER SHOVEL

Application filed October 10, 1929. Serial No. 398,778.

This invention relates to power shovels adapted for use in confined spaces such as are encountered in mines, although not limited to this use alone, and has for its general object to provide such a shovel adapted to scoop and discharge material in confined spaces of a minimum vertical height all with a view toward compactness, convenience, adaptability, high production and general all around efficiency.

A prior application Serial Number 214,027 filed August 19, 1927, relates to a power shovel of the same general type as is described in my present invention. The machine of my present invention, however, is so arranged as to operate in mines having a relatively low top and by a novel construction and arrangement of parts may operate in thinner seams of coal than the power shovel shown in my aforementioned prior application.

Other objects of my invention will appear from time to time as this specification proceeds.

My invention may be more clearly understood with reference to the accompanying drawings wherein:—

Figure 1 is a top plan view of a power shovel embodying my invention;

Figure 2 is a side elevation of the device shown in Figure 1;

Figure 3 is an enlarged partial side elevation of the device shown in Figure 1 with parts broken away and in section to more clearly show the details of my invention;

Figure 4 is an enlarged fragmentary sectional view taken on line 4—4 of Figure 1 with parts broken away;

Figure 5 is an enlarged partial sectional view taken on line 5—5 of Figure 1;

Figure 6 is an enlarged partial plan view of the device shown in Figure 1 with parts broken away and in section to more clearly show the details of my invention;

Figure 7 is an enlarged partial side view of the device of my invention with parts broken away and in section;

Figure 8 is a diagrammatic side elevation of the machine showing the parts thereof in different positions;

Figure 9 is a diagrammatic side elevation of the machine showing the parts thereof in different positions than are shown in Figure 8; and Figure 10 is a diagrammatic view of the fluid pressure system of the machine.

Like numerals refer to like parts throughout the various figures.

Referring now in particular to the drawings, 1 designates a power shovel of the type embodying my invention which is supported on a base frame 2. The base frame 2 in turn is mounted for propulsion on suitable laterally spaced continuous tread mechanisms 3. A turntable 4 supports the major part of the shovel operating mechanism and is rotatably supported on the base frame 2 in an upright bearing ring 2a.

Mounted on opposite sides of the base frame 2 and in diametrically opposite relation with the turntable 4 are a pair of upwardly facing vertically disposed fluid pressure cylinders 5 containing pistons 6, so arranged that the pistons may be raised by fluid pressure in the cylinder to engage a fixed part, such as a mine roof thus forming a means for holding the base frame 2 and machine while it is in operation.

Mounted on opposite sides of the base frame 2 and at the forward end thereof are a pair of downwardly facing vertically disposed fluid pressure cylinders 7 containing double acting pistons 8. The pistons 8 have a rod 9 projecting downwardly therefrom which have a foot 10 on the lower ends thereof for engaging a fixed part such as a mine bottom thus forming a means to aid the pistons 6 to hold the base frame 2 and machine while it is in operation.

Extending over the turntable 4 in central relation therewith is a conveyor chute generally indicated at 12. This conveyor chute is carried on the turnable for longitudinal thrusting and selective angular and bodily vertical movement throughout a range of substantially horizontal positions and comprises a pair of vertically disposed beam members 13 of Z shaped section arranged with the upper web facing outwardly in a common horizontal plane and the lower web facing inwardly and having a conveyor chute structure 14 extending between said beam members and longitudinally thereof and secured thereto. See Figures 1, 4 and 5. The base frame 2 is cut away as indicated by dotted lines at 11 to permit limited horizontal pivotal movement of the turntable 4 on the base frame 2 when the conveyor chute 12 is in a lowered position.

The conveyor chute 12 is supported for slidable movement in a frame member 15. The frame member 15 comprises a pair of parallel arms 16 disposed on the outsides of the beam members 13 and extending longitudinally of the same for carrying said beam members for longitudinal movement with respect thereto. The parallel arms 16 are joined together at their rearward end by a cross piece 17 integral therewith as is shown in Figure 4 and are joined together at their forward end by means of a cross piece 18 in a usual manner as is illustrated in Figures 3 and 5.

The conveyor chute 12 is formed at its front end into a forwardly facing scoop indicated at 19 which forms a continuation of the chute structure thereof and accordingly communicates therewith for purposes hereinafter described.

The frame member 15 is supported at its rearward end by means of two arms 20, disposed on opposite sides and pivoted thereto on a horizontal transverse axis above the conveyor chute 12. Each arm 20 is pivoted near its central portion to a lever arm 21 pivotally mounted on the turntable 4 and pivoted at its lower end to a block 22 slidable in a guide 23 on the turntable 4. The lever arm 21 has a guide 24 at the end opposite its point of pivotal connection to the arm 20 in which is slidably mounted a block 25. The block 25 is pivoted at each of its ends and is journaled in journal boxes 26—26 on the turntable 4. A screw 27 extends longitudinally through the guide 24 and is threaded through the block 25. The head of the screw 27 bears against the outer end of the lever arm 21 while its opposite end has a collar 28 pinned thereon which bears against the opposite outer end of said lever arm so that rotation of said screw moves the block 25 in the guide 24 to provide an adjustable pivotal axis for the lever arm 21, which constitutes a means for adjusting the height of the conveyor chute 12 as will hereinafter be more fully set forth.

Integral with the lever arms 21 and extending forwardly therefrom is a cradle 30. The cradle 30 includes a pair of parallel arms 31, each arm 31 extending forwardly from each lever arm 21. The parallel arms 31 are joined together near their rearward end by means of a cross member 32 extending beneath the frame member 15. The forward ends of the parallel arms 31 are slidably engaged in guides 33 on respective sides of the forward ends of the parallel arms 16 of the frame member 15 so that movement of said frame member 15 causes movement of the arms 31 which in turn moves the lever arms 21 about their common pivotal axis.

Mounted on the turntable 4 adjacent each side of the frame member 15 when the chute 12 is in its upwardmost horizontally position is a horizontal arranged cylinder 35. The cylinder 35 has a rearwardly extending plunger 36 movable therein by means of fluid pressure in a manner hereinafter to be described. A pair of sheaves 37 are mounted on the outer end of the plunger 36. A pair of cables 38 have one end attached to the rearward end of the cylinder 35 and extend rearwardly therefrom around the respective sheaves 37. The cables 38 are trained forwardly from the sheaves 37 around sheaves 39 on the forward end of the cylinder 35, and have their forward ends held in a cable clamping member 41 on the forward end of the parallel arm 16. A take-up is provided on the cable clamping member 41 to adjust for slackness in the cable which herein comprises a machine screw 42 having its head bearing against the outer portion of the parallel arm 16 and its opposite end threaded in the cable clamping member 41 which is slidable vertically in guides within the arm 16. See Figure 5.

Figures 2 and 3 show the conveyor chute 12 in a horizontal position and show the sheaves 37 and plungers 36 in their rearwardmost position with respect to the cylinders 35. It may be seen that upon a release of pressure within the cylinders 35 when the plungers 36 are in the position shown in Figures 2 and 3 that the weight of the frame member 15 effects angular downward movement of the frame member 15 and conveyor chute 12, and that the application of pressure to the plungers 36 moves said plungers outwardly or rearwardly within the cylinders 35 which effects angular vertical upward movement of the frame member 15 and conveyor chute 12. Thus as pressure is released from the cylinders 35 and plungers 36, the frame member 15 and conveyor chute 12 move downwardly and the reaction of the guides 33 on the parallel arms 31 of the cradle 30 which is integral with the lever arms 21, as hereinbefore described, moves said cradle about the axis of pivotal connection of the lever arms 21 to the turntable 4. This pivotally moves the lever arms 21 with respect to the turntable which pivots and slides the arms 20 in the guides 23 and thus effects vertical angular lowering of the rearward end of the frame member 15 as is indicated in dotted lines in Figure 3 and as is indicated in solid in Figures 8 and 9, and vice versa application of pressure to the plungers 36 effects vertical angular raising movement of the frame member 15 in a similar manner.

Figure 8 shows the conveyor chute 12 in an elevated horizontal position in dotted lines and in an inclined lowered position in solid lines. In viewing this figure it may be seen that as the forward end of the conveyor chute 12 is lowered, it moves about the axis of pivotal connection of the frame member 15 with the arms 20 and that since the lower extremities of the arms 20 are simultaneously moved forward in the guides 23 and pivoted about their axis of pivotal connection to the blocks 22 as the conveyor chute 12 is lowered, said chute rotates about a predetermined point disposed rearwardly of the axis of pivotal connection of the frame member 15 with the arms 20, which axis is designated by the reference character A.

Figure 9 shows the conveyor chute 12 adjusted for operation in low coal. This adjustment is effected by movement of the pivoted block 25 upwardly along the guides 24 by means of the adjusting screws 27 in a manner which has hereinbefore been described, the conveyor chute 12 being in its extreme lowermost horizontal position when the blocks 25 are at the top portion of the guides 24. Thus as the blocks 25 are moved upwardly along the guides 24 the point "A" about which the conveyor chute 12 rotates, moves outwardly along said chute 12 and said point is at the extreme outer end of the conveyor chute 12 when the blocks 25 are at top of the guides 24. Thus when the conveyor chute 12 is in its extreme lowermost horizontal position there is no vertical upward movement of the conveyor chute 12 upon raising or lowering of said conveyor chute. This enables said conveyor chute to operate in mines where the top is low without interference with said top during the loading operation.

The conveyor chute 12 is operated longitudinally with respect to the arms 16 to permit the scoop 19 to scoop up the material to be loaded as follows: See Figures 3, 4, 5, 6, 7 and 10.

A fluid pressure cylinder 44 extends longitudinally of the conveyor chute 12 along the central portion thereof and is fixed at its ends in the cross pieces 17 and 18 of the frame member 15 in a suitable manner. A plunger 45 extends forwardly from the fluid pressure cylinder 44 and has its forward end secured to a member 46 fixed on the conveyor chute 12. Fluid pressure in the cylinder 44 effects forward movement of the conveyor chute 12 in an obvious manner. This cylinder is accordingly called an out cylinder.

A pair of fluid pressure cylinders 47 extend longitudinally of the conveyor chute 12 on each side of the cylinder 44 and are secured in the cross pieces 17 and 18 of the frame member 15. These cylinders are provided with plungers 48 extending rearwardly therefrom having the rearward ends thereof secured with a cross piece 49 fixed on the conveyor chute 12. Fluid pressure in these cylinders effects rearward movement of the conveyor chute 12 in an obvious manner so these cylinders are accordingly called in-cylinders.

The turntable 4 is operated angularly with respect to the base frame 2 in the following manner. See Figures 1, 2 and 10. Two cylinders 50 are mounted on the under portion of the turntable 4 transversely of said turntable, one beneath the other. Each cylinder 50 is provided with a plunger 52, one plunger 52 extending outwardly from one side of the turntable 4 and the other plunger 52 extending outwardly from the opposite side of the turntable 4. The outer end of each plunger 52 is provided with a head 53 which extends outwardly beyond each side of the cylinders 50. A tie rod 54 rearwardly of the cylinders 50 is provided to connect each of the heads 53 together in a usual manner while a rack 55 having its teeth extending forwardly from the cylinders 50, in a vertical plane, connects the opposite ends of the heads 53 together. Thus pressure in one cylinder 50 tends to move the rack 55 in one direction while pressure in the other cylinder 50 tends to move the rack 55 in an opposite direction. The teeth of the rack 55 mesh with teeth on the outer periphery of an arcuate shaped rack 57 fixed to the rearward end of the base frame 2. As so arranged, the arcuate shaped rack 57 being held stationary and the teeth of the rack 55 meshing with the teeth of said arcuate shaped rack, fluid pressure in either of the cylinders 50 effects movement of said cylinders 50 which effects turning of the turntable 4 with respect to the base frame 2 in the corresponding direction.

Mounted on one side of the turntable 4 adjacent the rearward end thereof and extending longitudinally therewith is a motor 60. Mounted on the opposite side of the turntable 4 adjacent the rearward end thereof is a fluid pressure pump 61 driven by the motor 60 by means of suitable reduction gearing which includes a motor pinion 62 which drives a spur gear 63 on a shaft 64. A bevel pinion 65 keyed on said shaft meshes with and drives a bevel gear 66 keyed on one end of a transverse shaft 67. A bevel gear 68 on the opposite end of said transverse shaft drives a bevel gear 69 which drives the pump 61 through a gear train generally indicated at 70.

A transversely disposed manually controlled planetary transmission and brake device 71 is mounted on the base frame 2 and is driven from the shaft of the pump 61 through reduction gearing 72. The transmission device 71 is operatively connected with the continuous tread devices 3 for moving the power shovel about the mine by means of chain and sprocket driving devices 73.

Operation of the scoop 19 to scoop material thereon is obvious. Means are provided for discharging material from said scoop rearwardly of the power shovel which means herein preferably includes the conveyor chute 12. In order to effect rearward movement of material for discharge from the scoop 19 the conveyor chute 12 is reciprocably moved or vibrated longitudinally in a manner similar to that shown in my aforementioned prior application Serial Number 214,027 filed August 19, 1927.

Mounted on the extreme rear end of the turntable 4 and depending therefrom is a double acting reciprocating slushing pump 75. This slushing pump is similar to that described in my aforementioned prior application so will only be described and shown in so far as is necessary to make my present invention understandable, and comprises a pair of alined cylinders 76 having plungers 77 therein connected together in a usual manner so that one of said plungers is on the pressure stroke while the other of said plungers is on the release stroke as is diagrammatically shown in Figure 10. The plungers 77 are reciprocated through a suitable driving means from the motor 60 including a connecting rod 78, crank 79 and gear train 80 driven by the shaft 64.

The hereinbefore described cylinders 44 and 47 and their plungers 45 and 48 constitute double acting fluid pressure means for longitudinally reciprocating the conveyor chute 12, and in order to effect longitudinal vibration of this conveyor chute to effect the movement of material rearwardly therefrom for discharge, the cylinders 76 are communicated with respective of the cylinders 44 and 47 to alternate the application of fluid pressure therein as hereinafter described.

Referring now in particular to the hydraulic system for controlling the various movements of the hydraulically operated parts, the pump 61 driven by the motor 60 serves to effect pressure in the system. The connections from this pump to the cylinders 7, 35, 44 and 47 and from the slusher pump 75 to the cylinders 44 and 47 are effected through gang valves generally indicated at 81, which are mounted above the motor 60 on the turntable 4 and extend longitudinally therealong. See Figures 1 and 2.

These gang valves are manually controlled in a manner unnecessary to be described, and are employed to apply fluid pressure to and release fluid pressure from the cylinder 7 for holding the power shovel in a steady position while operating, to alternately apply fluid pressure to and release fluid pressure from the lift cylinders 35, to alternately apply fluid pressure to and release fluid pressure from the out cylinder 44, to alternately apply fluid pressure to and release fluid pressure from the in-cylinders 47, and to connect the slusher pump 75 with the cylinders 44 and 47 for vibrating the conveyor chute 12.

To effect this the following connections are employed. See Figure 10. A high pressure pipe 85 leads from the outlet of the pump 61 to the gang valves 81 and a return pipe 86 leads from the gang valves 81 to a pipe 88 mounted on the turntable 4 forwardly of the pump 61, the pump 61 drawing fluid from the tank 87 through a pipe 88.

A branched pipe 89 leads from the gang valves to the head end of the cylinders 7 while a second branched pipe 90 leads from the gang valves to the piston rod end of the cylinders 7. A third branched pipe 91 leads from the gang valves to the lifting cylinders 35. Another pipe 92 leads from the gang valves 81 to the out cylinder 44, while a branched pipe 93 leads from the gang valves 81 to the in-cylinders 47.

The gang valves 81 are so arranged that when fluid pressure is applied to the out cylinder 44 pressure in the in-cylinders 47 is released, and, vice versa, when fluid pressure is applied to the in-cylinders 47 pressure in the out-cylinder 44 is released.

Referring now in particular to the means for connecting the slusher pump 75 to the out cylinder 44 and in-cylinders 47, included in the gang valves 81 are four poppet valves 95, 96, 97 and 98 which are of an ordinary construction so are not shown or described in detail. A pipe 99 leads from one cylinder 76 of the slusher pump 75 to the valves 95 and 96 while a second pipe 100 leads from the opposite cylinder 76 to the valves 97 and 98. Leading from the valve 98 to the pipe 92 is a pipe 101 which connects said valve with the out-cylinder 44. Leading from the valve 95 to the pipe 93 is a pipe 102 which connects said valve with the in-cylinders 47. The valves 95 and 98 serve to connect the in-cylinders 47 and out-cylinder 44 with the slusher pump 75 while the valves 96 and 97 serve to connect the respective pipes 99 and 100 with the low pressure return pipe 86 when the valves 95 and 98 are closed.

When the machine is being operated to scoop material the valves 95 and 98 are closed to disconnect the slushing pump from the in and out cylinders and the valves 96 and 97 are open to connect the cylinder 76 with the low pressure return pipe 86. When these valves are so positioned the cylinders 76 are by-passed into the low pressure pipe and operation of the slushing pump simply effects a reciprocating fluid movement in the low pressure return pipe and tank 87.

When it is desired to longitudinally vibrate the conveyor chute 12, the valves which connect the cylinders 7, 35, 44 and 47 directly to the high pressure line are closed, and the valves 95 and 98 are open and the valves 96 and 97 are closed. The closing of the valves 96 and 97 disconnects the cylinders 76 from the low pressure return pipe 86, and the opening of the valves 95 and 98 connects one cylinder 76 with the in-cylinders 47 and the other cylinder 76 with the out-cylinder 44. It may be noted that the cylinder 76 which is connected to the out cylinder 44 is of a larger diameter than the cylinder 76 connected to the in-cylinders 47. The purpose in so constructing these cylinders of the slushing pump 75 is to compensate for the difference in area of the cylinders 44 and 47. Vibration of the conveyor chute 12 is effected by the alternation of pressure in the in and out cylinders by means of the slushing pump 75.

In order that the plungers 77 operating in the cylinders 76 may draw fluid from the tank 87 when the valves 96 and 97 are closed, so as to provide for possible leakage, automatic check valves 103 are connected with the pipes 99 and 100. These check valves are arranged to open with suction effected by the plungers 77 operating in the cylinders 76 and are kept in a closed position by means of springs of any suitable construction as is shown diagrammatically in Figure 10.

Pressure in the cylinders 50 for operating the turntable 4 is controlled by manually manipulated valves 105 communicating with said cylinders and connected with the high pressure pipe 85 by a pipe 106 and with the low pressure return pipe 86 by a pipe 107.

Pressure in the jack cylinders 5 is controlled by manually manipulated jack valves 109 communicating with said cylinders and connected with the high pressure pipe 85 by a pipe 110 and with the low pressure return pipe 86 by a pipe 111.

It may thus be seen that I have provided a machine for loading coal or any other loose material of a compact design which requires a minimum vertical height which may load in confined spaces such as mine entries of limited lateral and vertical dimensions. It may also be seen that this loading machine comprises a conveyor chute supported on a turntable by a novel linkage arrangement having a scoop on its forward end, which conveyor chute is operated to scoop material and which material is moved rearwardly along said conveyor chute by longitudinal vibration of said conveyor chute. This scooping operation may be repeated until the entire length of the conveyor chute contains material scooped during a plurality of scooping operation or each separate scoop of material may be discharged beyond the rear of the conveyor chute 12 by longitudinally vibrating said conveyor chute 12 as hereinbefore described.

Although I have shown and described one embodiment of my invention, it will be understood that the arrangement and construction of the various parts may be altered or changed without departing from the spirit and scope thereof. Furthermore, I do not wish to be construed as limiting myself to the specific form illustrated, excepting as it may be limited in the appended claims.

I claim as my invention:

1. In a power shovel, the combination with a base frame, a beam provided with a scoop at its front end, means for carrying said beam to effect vertical movement thereof comprising elevating means for raising and lowering the forward end of said beam, supporting means cooperating with said elevating means including a pivotal support for said beam rearwardly of said elevating means, and a lever arrangement connectible with said pivotal support for causing said beam to pivot about a relatively fixed imaginary point rearwardly of the point of pivotal connection of said pivotal support to said beam upon operation of said elevating means.

2. In a power shovel, the combination with a base frame, a beam provided with a scoop at its front end, means for carrying said beam to effect vertical movement thereof comprising elevating means for raising and lowering the forward end of said beam, supporting means connectible with said elevating means for supporting the rearward portion of said beam upon vertical movement of the forward portion of said beam including a pivotal support for said beam rearwardly of said elevating means comprising a lever pivotally connectible with said beam at one end and pivotally movable with respect to said base frame at its opposite end, and a second lever connectible with said first mentioned lever intermediate its ends and pivotally movable with respect to said base frame.

3. In a power shovel, the combination with a base frame, a beam provided with a scoop at its front end, means for carrying said beam to effect vertical movement thereof comprising elevating means for raising and lowering the forward end of said beam, supporting means connectible with said elevating means for supporting the rearward portion of said beam upon vertical movement of the forward portion of said beam including a pivotal support for said beam rearwardly of said elevating means comprising a lever pivotally connectible with said beam at one end, and pivotally movable with respect to said base frame and slidable longitudinally thereof at its opposite end.

4. In a power shovel, the combination with a base frame, a beam provided with a scoop at its front end, means for carrying said beam to effect vertical movement thereof comprising elevating means for raising and lowering the forward end of said beam, supporting means connectible with said elevating means for supporting the rearward portion of said beam upon vertical movement of the foward portion of said beam including a pivotal support for said beam rearwardly of said elevating means comprising a lever pivotally connectible with said beam at one end, and pivotally movable with respect to said base frame and slidable longitudinally thereof at its opposite end, and a second lever connectible with said first mentioned lever intermediate its ends, said second mentioned lever being pivotally movable with respect to said base frame.

5. In a power shovel, the combination with a base frame, a beam provided with a scoop at its front end, means for carrying said beam to effect vertical movement thereof comprising elevating means for raising and lowering the forward end of said beam, supporting means connectible with said elevating means for supporting the rearward portion of said beam upon vertical movement of the forward portion of said beam including a pivotal support for said beam rearwardly of said elevating means comprising a lever pivotally connectible with said beam at one end, and pivotally movable with respect to said base frame and slidable longitudinally thereof at its opposite end, and a second lever connectible with said first mentioned lever intermediate its ends, said second mentioned lever being pivotally movable with respect to said base frame, and means interposed between said elevating means and said second mentioned lever for pivotally moving said second mentioned lever with respect to said base frame upon operation of said elevating means.

6. In a power shovel, the combination with a base frame, a beam provided with a scoop at its front end carried thereon, means for carrying said beam to effect vertical and longitudinal movement thereof comprising a supporting frame extending longitudinally along said beam on each side thereof for a portion of its length, elevating means connectible with the forward end of said supporting frame, and a lever pivotally connectible with each side of the rearward end of said supporting frame at one end and pivotally movable with respect to said base frame and slidable longitudinally thereof at its opposite end.

7. In a power shovel, the combination with a base frame, a beam provided with a scoop at its front end carried thereon, means for carrying said beam to effect vertical and longitudinal movement thereof comprising a supporting frame extending longitudinally along said beam on each side thereof for a portion of its length, elevating means connectible with the forward end of said supporting frame, a lever pivotally connectible with each side of the rearward end of said supporting frame at one end and pivotally movable with respect to said base frame and slidable longitudinally thereof at its opposite end, and a second lever pivotally movable with respect to said base frame and connected to said first mentioned lever intermediate the ends of said first mentioned lever.

8. In a power shovel, the combination with a base frame, a beam provided with a scoop at its front end carried thereon, means for carrying said beam to effect vertical and longitudinal movement thereof comprising a supporting frame extending longitudinally along said beam on each side thereof for a portion of its length, elevating means connectible with the forward end of said supporting frame, a lever pivotally connectible with each side of the rearward end of said supporting frame at one end and pivotally movable with respect to said base frame and slidable longitudinally thereof at its opposite end, a second lever pivotally movable with respect to said base frame and connected to said first mentioned lever intermediate the ends of said first mentioned lever, and means connectible with said elevating means and said second mentioned lever for pivotally moving said second mentioned lever with respect to said base frame upon operation of said elevating means.

9. In a power shovel, the combination with a base frame, a supporting frame, a beam carried by said supporting frame and longitudinally movable with respect thereto, a scoop on the forward end of said beam, means to effect vertical movement of said beam comprising elevating means connectible with the forward end of said supporting frame, and a lever arrangement pivotally connectible with the rearward end of said supporting frame for causing said beam to pivot about a relatively fixed point rearwardly of the point of pivotal connection of said lever arrangement to said beam including an arm interposed between said elevating means and said lever arrangement.

10. In a power shovel, the combination with a base frame, a supporting frame, a beam carried by said supporting frame and longitudinally movable with respect thereto, a scoop on the forward end of said beam, and means to effect vertical movement of said beam comprising elevating means connectible with the forward end of said supporting frame, and a lever arrangement pivotally connectible with the rearward end of said supporting frame for causing said beam to pivot about a relatively fixed point rearwardly of the point of pivotal connection of said lever arrangement to said beam including levers connected to the respective sides of said supporting frame at one end above said beam, members movable longitudinally of said base frame and means for pivotally connecting the opposite ends of said levers to said members.

11. In a power shovel, the combination with a base frame, a supporting frame, a beam carried by said supporting frame and longitudinally movable with respect thereto, a scoop on the forward end of said beam, and means to effect vertical movement of said beam comprising elevating means connectible with the forward end of said supporting frame, and a lever arrangement pivotally connectible with the rearward end of said supporting frame for causing said beam to pivot about a relatively fixed point rearwardly of the point of pivotal connection of said lever arrangement to said beam including levers pivotally connected to the respective sides of said supporting frame at one end, members movable longitudinally with respect to said base frame, means for pivotally connecting the opposite ends of said levers to said members and levers pivotally mounted on said base frame at one end and pivotally connected to said first mentioned levers intermediate their ends at their opposite ends.

12. In a power shovel, the combination with a base frame, a supporting frame, a beam carried by said supporting frame and longitudinally movable with respect thereto, a scoop on the forward end of said beam, and means to effect vertical movement of said beam comprising elevating means connectible with the forward end of said supporting frame, and a lever arrangement pivotally connectible with the rearward end of said supporting frame for causing said beam to pivot about a relatively fixed point rearwardly of the point of pivotal connection of said lever arrangement to said beam including levers pivotally connected to the respective sides of said supporting frame at one end, members movable longitudinally of said base frame, means for pivotally connecting the opposite ends of said levers to said members, levers pivotally mounted on said base frame at one end and pivotally connected to said first mentioned levers intermediate their ends at their opposite ends, and arms interposed between said elevating means and said last mentioned levers for pivoting said levers upon operation of said elevating means.

13. In a power shovel, the combination with a base frame, a turntable thereon, a supporting frame, a beam carried by said supporting frame and longitudinally movable with respect thereto, a scoop on the forward end of said beam, elevating means connectible with the forward end of said supporting frame comprising a fluid pressure actuating device and flexible means connectible with said fluid pressure actuating device and the forward end of said supporting frame, and means connectible with the rearward end of said supporting frame for causing said beam to pivot about a relatively fixed point rearwardly of the point of connection of said means to said supporting frame upon operation of said elevating means comprising levers pivotally connected at one end to respective sides of said supporting frame, members movable longitudinally of said base frame and means for pivotally connecting the opposite ends of said levers to said members.

14. In a power shovel, the combination with a base frame, a turntable thereon, a supporting frame, a beam carried by said supporting frame and longitudinally movable with respect thereto, a scoop on the forward end of said beam, elevating means connectible with the forward end of said supporting frame comprising a fluid pressure actuating device and flexible means connectible with said fluid pressure actuating device and the forward end of said supporting frame, and means connectible with the rearward end of said supporting frame for causing said beam to pivot about a relatively fixed point rearwardly of the point of connection of said means to said supporting frame upon operation of said elevating means comprising levers pivotally connected at one end to respective sides of said supporting frame, members movable longitudinally of said base frame, means for pivotally connecting the opposite ends of said levers to said members, levers pivotally mounted on said base frame at one end and pivotally connected at their opposite ends to said first mentioned levers, and means actuated by said elevating means for moving said last mentioned levers about their axes of pivotal connection with respect to said turntable.

15. In a power shovel, the combination with a base frame, a turntable thereon, a supporting frame, a beam carried by said supporting frame and longitudinally movable with respect thereto, a scoop on the forward end of said beam, elevating means connectible with the forward end of said supporting frame comprising a fluid pressure actuating device and flexible means connectible with said fluid pressure actuating device and the forward end of said supporting frame, and means connectible with the rearward end of said supporting frame for causing said beam to pivot about a relatively fixed point rearwardly of the point of connection of said means to said supporting frame upon operation of said elevating means, comprising levers pivotally connected at one end to respective sides of said supporting frame, members movable longitudinally of said base frame, means for pivotally connecting the opposite ends of said levers to said first mentioned levers intermediate the ends of said first mentioned levers, means actuated by said elevating means for moving said last mentioned levers about their axes of pivotal connection with respect to said turntable, and means for adjusting the horizontal height of said beam and the point about which said beam pivots.

16. In a power shovel, the combination with a base frame, a turntable thereon, a supporting frame, a beam carried by said supporting frame and longitudinally movable with respect thereto, a scoop on the forward end of said beam, elevating means connectible with the forward end of said supporting frame comprising a fluid pressure actuating device and flexible means connectible with said fluid pressure actuating device and the forward end of said supporting frame, and means connectible with the rearward end of said supporting frame for causing said beam to pivot about a relatively fixed point rearwardly of the point of connection of said means to said supporting frame upon operation of said elevating means comprising, levers pivotally connected at one end to respective sides of said supporting frame, members movable longitudinally of said base frame, means for pivotally connecting the opposite ends of said levers to said first mentioned levers intermediate the ends of said first mentioned levers, means actuated by said elevating means for moving said last mentioned levers about their axes of pivotal connection with respect to said turntable, and means for adjusting the horizontal height of said beam and the point about which said beam pivots, comprising a means for changing the axes of pivotal connection of said second mentioned levers with respect to said turntable.

17. In a power shovel, the combination with a conveyor provided with a scoop at its front end and communicating therewith for discharge of material beyond the rearward end of said conveyor, and means for carrying said conveyor to effect longitudinal thrusting movement and vertical lifting movement of said conveyor and scoop comprising a supporting frame, means for moving said conveyor longitudinal in said supporting frame, elevating means connectible with one end of said supporting frame, and means connectible with the opposite end of said supporting frame for causing said conveyor to pivot about a relatively fixed imaginary point rearwardly of the point of connection of said means to said supporting frame comprising a lever arrangement pivotally connectible to respective sides of said supporting frame and operatively connected to said elevating means.

18. In a power shovel, the combination with a conveyor chute provided with a scoop at its front end and communicating therewith, means for longitudinally vibrating said chute for effecting rearward movement of material on said chute for discharging said material beyond the rearward end of said chute, and means for carrying said conveyor chute to effect longitudinal thrusting movement and vertical lifting movement of said conveyor chute and scoop comprising a supporting frame, means for moving said conveyor chute longitudinally in said supporting frame, elevating means connectible with the forward end of said supporting frame, and means connectible with the opposite end of said supporting frame for causing said conveyor chute to pivot about a relatively fixed point rearwardly of the point of connection of said means to said supporting frame comprising a lever arrangement pivotally connectible to respective sides of said supporting frame above said conveyor chute and operatively connected to said elevating means so as to be actuated by said elevating means upon operation of said elevating means.

19. In combination with a machine of the character described, a base frame, a turntable thereon mounted for angular horizontal movement with respect to said base frame, a supporting frame, a conveyor carried by said supporting frame and longitudinally movable with respect thereto, a scoop carried on the forward end of said conveyor and communicating therewith, elevating means on the forward end of said turntable connectible with the forward end of said supporting frame, and means for supporting said supporting frame connectible with the rearward end thereof for causing said conveyor chute to pivot about a relatively fixed point rearwardly of the point of connection of said means to said supporting frame upon operation of said elevating means comprising levers pivotally connected at one end to respective sides of said turntable and members movable longitudinally of said turntable and having pivotal connection with said supporting frame and the opposite ends of said levers.

20. In combination with a machine of the character described, a base frame, a turntable thereon mounted for angular horizontal movement with respect to said base frame, a supporting frame, a conveyor carried by said supporting frame and longitudinally movable with respect thereto, a scoop carried on the forward end of said conveyor and communicating therewith, elevating means on the forward end of said turntable connectible with the forward end of said supporting frame, and means for supporting said supporting frame connectible with the rearward end thereof for causing said conveyor chute to pivot about a relatively fixed point rearwardly of the point of connection of said means to said supporting frame upon operation of said elevating means comprising, levers pivotally connected at one end to respective sides of said supporting frame, members movable longitudinally of said turntable, means for pivotally connecting the opposite ends of said levers to said members, levers pivotally mounted on said base frame at one end and pivotally connected at their opposite ends to said first mentioned levers intermediate the ends of said first mentioned levers, and means actuated by said elevating means for moving said last mentioned levers about their axes of pivotal connection with said turntable.

Signed at Chicago, county of Cook, State of Illinois, this 7th day of October, A. D., 1929.

WILLIAM W. SLOANE.